United States Patent [19]

Kobayashi et al.

[11] Patent Number: 5,015,524

[45] Date of Patent: May 14, 1991

[54] LENS SHEET

[75] Inventors: Yukio Kobayashi; Shoichi Nagai; Masatoshi Takesue; Fumito Aosai, all of Nagoya; Masao Inoue, Otake, all of Japan

[73] Assignee: Mitsubishi Rayon Company, Ltd., Tokyo, Japan

[21] Appl. No.: 457,242

[22] Filed: Dec. 27, 1989

[30] Foreign Application Priority Data

Dec. 27, 1988 [JP] Japan ............................... 63-329802
Jun. 1, 1989 [JP] Japan ............................... 1-137407

[51] Int. Cl.[5] ............................................ B32B 27/36
[52] U.S. Cl. .................................. 428/332; 428/413; 428/483; 428/423.7; 428/520; 428/913
[58] Field of Search ............ 428/332, 413, 483, 423.7, 428/520, 913

[56] References Cited

FOREIGN PATENT DOCUMENTS 41-117215A 8/1966 Japan .
63-167301 7/1988 Japan .

*Primary Examiner*—P. C. Sluby
*Attorney, Agent, or Firm*—Brumbaugh, Graves, Donohue & Raymond

[57] ABSTRACT

A lens sheet comprising a transparent substrate and a lens portion composed of a cured product of an ultraviolet-curable resin composition, which is formed on at least one surface of the transparent substrate. The resin composition exhibits a polymerization shrinkage at curing of not larger than 20% as calculated based on the difference of the specific gravity at 25° C., and a modulus of elasticity at 25° C. after curing of 10 to 1,000 $kg/cm^2$. The ultraviolet-curable resin composition is preferably comprised of a polyvalent (meth)acrylate, a mono(meth)acrylate and a photopolymerization initiator.

17 Claims, No Drawings

LENS SHEET

BACKGROUND OF THE INVENTION

1. Field of the Invention

The present invention relates to a lens sheet such as a Fresnel lens or lenticular lens used for a screen of a video projection television, or a condensing Fresnel lens.

2. Description of the Related Art

In the production of a lens sheet such as a Fresnel lens or lenticular lens, when the size is relatively small and mass production is carried out, an injection molding process for synthetic resins is generally adopted. When a relatively large lens, such as the above-mentioned screening lens or condensing lens, is prepared, a process is generally adopted in which a resin plate is fitted to a flat lens mold and is heated and pressed to transfer the lens surface profile to the resin plate. In the latter process, however, a long time is needed for heating and cooling, and the process is disadvantageous in that the productivity cannot be increased.

As the means for eliminating this disadvantage, there has been proposed a process comprising interposing an ultraviolet-curable resin liquid between a lens mold and a transparent substrate and curing the resin under irradiation with ultraviolet rays (see Japanese Unexamined Patent Publication No. 61-177215), and a transmission type screen comprising a Fresnel lens or lenticular lens prepared by this process is known (see Japanese Unexamined Patent Publication No. 63-167301).

When a lens sheet as mentioned above is prepared, an ultraviolet-curable resin used for this production must have such properties as adhesion to a transparent substrate, release from a lens mold, strength and shape-retaining of a lens portion after curing, and light transmission.

The processes disclosed in the above-mentioned two patent publications will now be discussed with reference to these properties. In the former process, ultraviolet-curable resins are not specifically explained, and in the screen of the latter technique, it is taught that an ultraviolet-curable resin having a viscosity not larger than 500 cps before curing, a polymerization shrinkage not larger than 10% at curing, 10 and a modulus of elasticity of 5,000 to 30,000 kg/cm$^2$ after curing is used.

If this ultraviolet-curable resin is used, however, the Young's modulus is too high and removal from the lens mold is difficult, and if the molded lens is forcibly removed from the mold, the lens portion is sometimes chipped. Moreover, the specific ultraviolet-curable resin most preferably used in this technique is discolored after the curing, and thus it is obvious that this resin is not suitable for a lens.

SUMMARY OF THE INVENTION

Under the above-mentioned background, the inventors carried out research, and as a result, found that the use of the above-mentioned ultraviolet-curable resin, which becomes hard after curing, renders the release from a mold difficult, whereas better results are obtained when an ultraviolet-curable resin which is soft after curing is used.

More specifically, in accordance with the present invention, there is provided a lens sheet comprising a transparent substrate and a lens portion composed of a cured product of an ultraviolet-curable resin composition, which is formed on at least one surface of the transparent substrate, wherein the polymerization shrinkage, calculated based on the difference of the specific gravity at 25° C., of the ultraviolet-curable resin, caused at curing, is not larger than 20% and the modulus of elasticity at 25° C. after curing is 10 to 1,000 kg/cm$^2$.

DESCRIPTION OF THE PREFERRED EMBODIMENTS

The lens sheet of the present invention will now be described in detail.

An ultraviolet-curable resin composition composed of compounds described hereinafter is used in the present invention. The polymerization shrinkage caused at curing must be not larger than 20%. If this polymerization shrinkage is 20% or larger because of the shrinkage of the lens sheet in the plane direction, strangling the lens mold occurs, and simultaneously, because of the shrinkage of the lens sheet in the thickness direction, rising from the lens mold occurs and a satisfactory transfer of a lens profile from the lens mold cannot be obtained.

The polymerization shrinkage referred to herein is a polymerization shrinkage calculated based on the difference of the specific gravities of the resin composition at 25° C., which is defined by the following formula:

$$\text{Polymerization shrinkage S} = [dp - dm)/dp] \times 100 \ (\%)$$

wherein dm represents the specific gravity of the ultraviolet-curable resin composition (monomer mixture) at 25° C. and dp represents the specific gravity of the cured product of the ultraviolet-curable resin composition at 25° C.

Also, the modulus of elasticity at 25° C. of the ultraviolet-cured resin after curing must be 10 to 1,000 kg/cm$^2$. If the modulus of elasticity is larger than 1,000 kg/cm$^2$, when the formed lens sheet is released from the lens mold, a large force is necessary, and thus release from the mold is difficult and chipping occurs at the top end of the lens if the formed lens sheet is forcibly released from the mold. If the modulus of elasticity is smaller than 10 kg/cm$^2$, the resin is too soft and the shape of the lens cannot be retained. If the modulus of elasticity is from 10 to 1,000 kg/cm$^2$, the release property is improved, and even if the formed lens comes to contact with a vessel or implement, a dented part is restored to the original shape by the rubber-like elasticity and the formed lens is not damaged. Furthermore, scratching is not caused by friction, and when at least two sheets are combined and used as a transmission type screen, especially good results can be obtained.

Preferably, the viscosity at 25° C. of the ultra-violet-curable resin composition used in the present invention before the curing is not larger than 300 mPa·s. If this viscosity is larger than 300 mPa·s, air bubbles are readily included in the resin composition when cast in the lens mold, and such bubbles are difficult to remove. Moreover, if the viscosity is thus increased, the flowability is lowered, casting in the lens mold becomes difficult, and thus a long time is needed for casting.

Preferably the total luminous transmittance of the lens portion composed of the ultraviolet-cured resin used in the present invention, as calculated as the thickness of 1 mm is at least 85%. If the total luminous transmittance is not larger than 85%, the light transmission performance of the lens sheet is poor. Preferably, the lens sheet has no warp. In connection with the warping, preferably, when the lens sheet is horizontally placed, the rise of the lens sheet satisfies the requirement represented by the following formula:

$$D \leq R/50$$

wherein D represents the rise (mm) and R represents the distance (mm) in the horizontal direction from the center of the lens sheet.

If the warp quantity of the lens sheet fails to satisfy the requirement represented by the above-mentioned mentioned formula, the designed optical performances cannot be obtained in the lens.

An ultraviolet-curable resin composition comprising a polyvalent methacrylate and/or acrylate, a monomethacrylate and/or acrylate and a photopolymerization initiator is preferably used as the ultraviolet-curable resin having the above-mentioned properties. As the polyvalent methacrylate and acrylate, there can be mentioned a polyol polymethacrylate, a polyol polyacrylate, a polyester polymethacrylate, a polyester polyacrylate, an epoxy polymethacrylate, an epoxy polyacrylate, a urethane polymethacrylate, and a urethane polyacrylate. These compounds can be used alone or in the form of a mixture of two or more thereof. From the viewpoint of the modulus of elasticity, a polyol polymethacrylate a polyol polyacrylate, a urethane polymethacrylate, and a urethane polyacrylate are preferably used. A reaction product between a polyether polyol and methacrylic acid or acrylic acid is preferable as the polyol polymethacrylate or polyacrylate, and a reaction product having a polyoxyalkylene glycol skeleton is especially preferable. In particular, a polyol polymethacrylate or polyacrylate formed by using a polyoxyalkylene glycol having a bisphenol skeleton as the polyether polyol is especially preferable in view of the modulus of elasticity and transparency. Of these polyol polymethacrylates and polyol polyacrylates, compounds represented by the following formula (I) are most preferable:

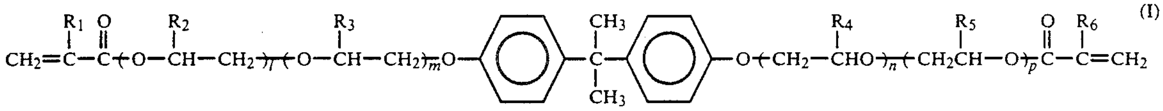

(I)

wherein $R_1$, $R_2$, $R_3$, $R_4$, $R_5$ and $R_6$ independently represent H or $CH_3$, and l, m, n and p are positive integers provided that the sum of l and m is not zero and the sum of n and p is not zero.

As specific examples of the compound represented by the general formula (I), there can be mentioned compounds formed by equivalently adding ethylene oxide or propylene oxide alone to bisphenol A, such as 2,2-bis[2-(meth)acryloyloxy-ethoxy-p-phenylene]-propane, 2,2-bis[2-(meth)acryloyloxy-2-methylethoxy-p-phenylene]-propane, 2,2-bis[5-(meth)acryloyloxy-3-oxapentanoxy-p-phenylene]-propane, 2,2-bis[5-(meth)acryloyloxy-2,5-dimethyl-3-opapentanoxy-p-phenylene]-propane, 2,2bis[8-(meth)acryloyloxy-3,6-dioxaoctanoxy-p-phenylene]-propane, 2,2-bis[8-(meth)acryloyloxy-2,5,8-trimethyl-3,6-dioxaoctanoxy-p-phenylene]-propane, 2,2-bis[11-(meth)acryloyloxy-3,6,9-trioxaundecanoxy-p-phenylene]-propane, 2,2-bis[11-(meth)acryloxy-2,5,8,11-tetramethyl-3,6,9-trioxaundecanoxy-p-phenylene]-propane, 2,2-bis[14-(meth-)acryloyloxy-3,6,9,12-tetraoxatetradecanoxy-p-phenylene]-propane, 2,2-bis[14-(meth)acryloyloxy-2,5,8,11,14-pentamethyl-3,6,9,12-tetraoxatetradecanoxy-p-phenylene]-propane, 2,2-bis[17-(meth)acryloyloxy-3,6,9,12,15-pentaoxaheptadecanoxy-p-phenylene]-propane, 2,2-bis[17-(meth)acryloyloxy-2,5,8,11,14,17-hexamethyl-3,6,9,12,15-pentaoxaheptadecanoxy-p-phenylene]-propane, 2,2-bis[20-(meth)acryloyloxy-3,6,9,12,15,18-hexaoxaeicosanoxy-p-phenylene]-propane and 2,2-bis[20-(meth)acryloyloxy-2,5,8,11,14,17,20-heptamethyl-3,6,9,12,15,18-hexaoxaeicosanoxy-p-phenylene]-propane, and compounds formed by equivalently adding both of ethylene oxide and propylene oxide to bisphenol A, such as 2,2-bis[5-(meth)acryloyloxy-2-methyl-3-oxapentanoxy-p-phenylene]-propane, 2,2-bis[5-(meth)acryloyloxy-5-methyl-3-oxapentanoxy-p-phenylene]-propane, 2,2-bis[2-(meth)acryloyloxy-2,5-dimethyl-3,6-dioxaoctanoxy-p-phenylene]-propane, 2,2-bis[2-(meth)acryloyloxy-5,8-dimethyl-3,6-dioxaoctanoxy-p-phenylene]-propane, 2,2-bis[11-(meth)acryloyloxy-2,5-dimethyl-3,6,9-trioxaundecanoxy-p-phenylene]-propane, 2,2-bis[11-(meth)acryloyloxy-8,11-dimethyl-3,6,9-trioxaundecanoxy-p-phenylene]-propane, 2,2-bis[14-(meth)acryloyloxy-2,5-dimethyl-3,6,9,12-tetraoxatetradecanoxy-p-phenylene]propane and 2,2-bis[14-(meth-)acryloyloxy-11,14-dimethyl-3,6,9,12-tetraoxatetradecanoxy-p-phenylene]-propane. Asymmetric compounds such as compounds formed by adding unequivalent moles of either ethylene oxide or propylene oxide to bisphenol A and compounds formed by adding unequivalent moles of ethylene oxide and propylene oxide to bisphenol A also can be used, although names of these compounds are not specified here.

A monohydric alcohol ester of (meth)acrylic acid is preferably used as the mono(meth)acrylate. Use of a large amount of an ester of a polyhydric alcohol such as a glycol with mono(meth)acrylic acid is not preferable because the release property from a metal mold is poor; presumably because of the influence of free hydroxyl groups. Furthermore, the use of a large amount of (meth)acrylic acid or a metal salt thereof is not preferable when a metal mold is used, because the release property from the metal mold is lowered; presumably because of a high polarity.

In view of the curing property, transparency, modulus of the elasticity, and adhesion to the transparent substrate, a reaction product between tetrahydrofurfuryl alcohol or a derivative thereof and (meth)acrylic acid is preferably used as the mono(meth)acrylate.

As the derivative of tetrahydrofurfuryl alcohol, there can be mentioned compounds represented by the following formulae (II) and (III):

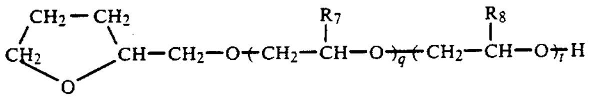
(II)

wherein $R_7$ and $R_8$ represent H or $CH_3$, and q and t are positive integers provided that the sum of q and t is not zero, and

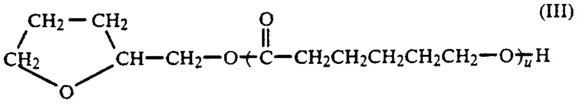
(III)

wherein u is a positive integer of at least one.

As specific examples of the compounds of the formulae (II) and (III), there can be mentioned 2-tetrahydrofurfuryloxy-ethanol, 1-methyl-2-tetrahydrofurfuryloxy-ethanol, 5-tetrahydrofurfuryloxy-3-oxapentan-1-ol, 1,4-dimethyl-5-tetrahydrofurfuryloxy-3-oxapentan-1-ol, 1-methyl-5-tetrahyirofurfuryloxy-3-oxapentan-1-ol, 4-methyl-5-tetrahydrofurfuryl-3,6-dioxaoctan-1-ol, 8-tetrahydrofurfuryloxy-3,6-dioxaoctan-1-ol, 1,4,7-trimethyl-8-tetrahydrofurfuryloxy-3,6-dioxaoctan-1-ol, 1,4-dimethyl-8-tetrahydrofurfuryloxy-3,6-dioxaoctan-1-ol, 1-methyl-8-tetrahydrofurfuryloxy-3,6-dioxaoctan-1-ol, 4,7-dimethyl-8-tetrahydrofurfuryloxy-3,6-dioxaoctan-1-ol, 7-methyl-8-tetrahyirofurfuryloxy-3,6-dioxaoctan-1-ol, 11-tetrahydrofurfuryloxy-3,6,9-trioxaundecan-1-ol, 1,4,7,10-tetramethyl-11-tetrahydrofurfuryloxy-3,6,9-trioxaundecan-1-ol, 1,4,7-trimethyl-11-tetrahydrofurfuryloxy-3,6,9-trioxaundecan-1-ol, 1,4-dimethyl-11-tetrahydrofurfuryloxy-3,6,9-trioxaundecan-1-ol, 1-methyl-11-tetrahydrofurfuryloxy-3,6,9-trioxaundecan-1-ol, 4,7,10-trimethyl-11-tetrahydrofurfuryloxy-3,6,9-trioxaundecan-1-ol, 7,10-dimethyl-11-tetrahydrofuryloxy-3,6,9-trioxaundecan-1-ol, 10-methyl-11-tetrahydrofurfuryloxy-3,6,9-trioxaundecan-1-ol, 14-tetrahydrofurfuryloxy-3,6,9,12-tetraoxatetradecan-1-ol, 1,4,7,10,13-pentamethyl-14-tetrahydrofurfuryloxy-3,6,9,12-tetraoxatetradecan-1-ol, 1,4,7,10-tetramethyl-14-tetrahydrofurfuryloxy-3,6,9,12-tetraoxatetradcan- 1-ol, 1,4,7-trimethyl-14-tetrahydrofurfuryloxy-3,6,9,12-tetraoxatetradecan-1-ol, 1,4-dimethyl-14-tetrahyirofurfuryloxy-3,6,9,12-tetraoxatetradecan-1-ol, 1-methyl-14-tetrahydrofurfuryloxy-3,6,9,12-tetraoxatetradecan-1-ol, 4,7,10,13-tetramethyl-14-tetrahydrofurfuryloxy-3,6,9,12-tetraoxatetradecan-1-ol, 7,10,13-trimethyl-14-tetrahydrofurfuryloxy-3,6,9,12-tetraoxatetradecan-1-ol, 10,13-dimethyl-14-tetra-hydrofurfuryloxy-3,6,9,12-tetraoxatetradecan-1-ol, 13-methyl-14-tetrahyirofurfuryloxy-3,6,9,12 tetra-oxatetradecan-1-ol, tetrahydrofurfuryl-1-hydroxyhexanoate, tetrahydrofurfuryl-1-hydroxy-6-oxo-7-oxatridecanoate, tetrahydrofurfuryl-1-hydroxy-6,13-dioxo-7,14-dioxaeicosanoate, tetrahydrofurfuryl-1-hydroxy-6,13,20-trioxo-7,14,21,trioxaheptacosanoate and tetrahyirofurfuryl-1-hydroxy-6,13,20,27-tetraoxo-7,14,21,28-tetraoxatetratriacontanoate. In these compounds, the sum of q and t in the formula (II) is up to 5, and u in the formula (III) is up to 5, but the sum of q and t in the formula (II) and u in the formula (III) may be 6 or larger.

In the present invention, a preferred ultraviolet-curable resin composition comprises 30 to 60% by weight of a polyol dimethacrylate of the following formula (a), which is included within the scope of the formula (I):

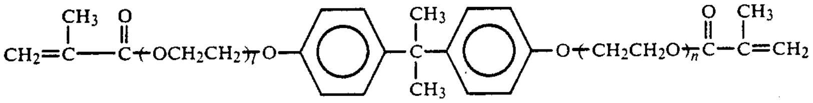
(a)

wherein l and n are positive integers satisfying the requirement of l+n=8 to 12, to 25% by weight of a polyol diacrylate of the following formula (b), which is included within the scope of the formula (I):

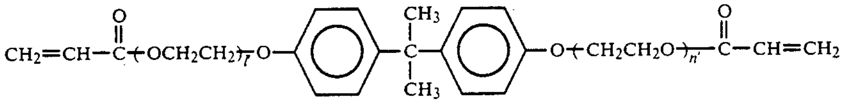
(b)

wherein l' and n' are positive integers satisfying the requirement of l'+n'=3 to 5, and 30 to 60% by weight of tetrahydrofurfuryl acrylate of the following formula (c), which is a reaction product between tetrahydrofurfuryl alcohol and acrylic acid:

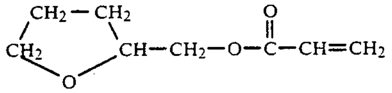
(c)

The reasons why the ultraviolet-curing resin composition comprising the above-mentioned three components (a), (b) and (c) is preferable are as follows. Namely, if the amount of the dimethacrylate component (a) is smaller than 30% by weight, violent heat generation or shrinkage often occurs upon irradiation with ultraviolet rays, and cracking or distortion of the cured resin often occurs. Furthermore, the transparent substrate is deteriorated, and when the formed lens sheet is removed from the mold, the transparent substrate is easily damaged. If the amount of the dimethacrylate component (a) is larger than 60% by weight, the rate of the curing reaction is low, and an insufficient curing often occurs at a part coming into contact with oxygen, resulting in contamination of the transparent substrate. Since the viscosity of the component (a) is about 400 mPa·s, i.e., relatively high, the viscosity of the ultraviolet-curable resin is increased, and therefore, when the resin composition is cast in the mold, air bubbles are readily included in the cast resin composition, and removal of these air bubbles is difficult. If the amount of the diacrylate component (b) is smaller than 5% by weight, the strength is reduced, the lens portion is easily chipped and sometimes is caused to collapse by compression. Furthermore, when the formed lens sheet is released from the lens mold, chipping and breaking often occur, and the handling is difficult. If the amount of the diacrylate component (b) is larger than 25% by weight, since the strength is raised and the elongation is lowered, an especially large force becomes necessary for removing the formed lens sheet from the mold, and upon release from the mold, breaking and chipping often occur. Furthermore, since the viscosity of the component (b) is high, i.e., about 900 mPa·s, air bubbles are readily included in the resin component when cast in the mold, and these bubbles are difficult to remove. If the amount of the acrylate component (c) is smaller than 30% by weight, since the high viscosities of the other components cannot be moderated, the viscosity of the resin composition is high, air bubbles are readily included in the resin composition at the casting step, and it is difficult to remove these bubbles. Moreover, when a polymethyl methacrylate plate is used as the transparent substrate, a sufficient adhesion to the substrate can be obtained. If the amount of the component (c) is larger than 60% by weight, since the strength is reduced, chipping of the lens portion or crushing by compression often occurs. Moreover, when the formed lens sheet is released from the lens mold, chipping or breaking easily occurs.

If a urethane polyacrylate (d) is further incorporated in an amount of 5 to 25% by weight in addition to the above-mentioned dimethacrylate (a), diacrylate (b) and monoacrylate (c), the elongation of the resin after the curing is increased although the strength is little changed, and therefore, defects such as chipping can be eliminated more easily. Accordingly, this embodiment is especially preferable. If the amount of the urethane polyacrylate (d) is smaller than 5% by weight, the effect of the increased the elongation is not satisfactory. If the amount of the urethane polyacrylate is larger than 25% by weight, the viscosity is increased, air bubbles are readily included in the resin composition at the casting step, and it is difficult to remove these bubbles. As the urethane polyacrylate used in the present invention, there can be mentioned a polyether urethane polyacrylate, a polyester urethane polyacrylate, a polyamide urethane polyacrylate and a polyisocyanate urethane polyacrylate.

As specific examples of the urethane polyacrylate, there can be mentioned urethane polyacrylates represented by the following formula (IV):

$$CH_2{=}CH{-}\overset{O}{\overset{\|}{C}}{-}O{-}R_9O{+}\overset{O}{\overset{\|}{C}}{-}\underset{}{\overset{H}{\overset{|}{N}}}{-}R_{10}{-}\overset{H}{\overset{|}{N}}{-}\overset{O}{\overset{\|}{C}}{-}O{-}R_{11}{-}O{)_V}\overset{O}{\overset{\|}{C}}{-}\overset{H}{\overset{|}{N}}{-}R_{12}{-}\overset{H}{\overset{|}{N}}{-}\overset{O}{\overset{\|}{C}}{-}O{-}R_{13}{-}O{-}\overset{O}{\overset{\|}{C}}{-}CH{=}CH_2 \quad (IV)$$

wherein $R_9$, $R_{10}$, $R_{11}$, $R_{12}$ and $R_{13}$ represent an alkylene or arylene group containing an ether, ester or amide group and V is an integer.

Preferably, a small amount of a photopolymerization initiator is incorporated into the ultraviolet-curing resin composition used in the present invention, especially the composition comprising the above-mentioned dimethacrylate (a), diacrylate (b) and monoacrylate (c) or the composition comprising the urethane acrylate (d) in addition to these components (a), (b) and (c). Most preferably, at least one photopolymerization initiator selected from the group consisting of methylbenzoyl formate, 1-hydroxycyclohexyl phenyl ketone and 2-hydroxy-2-methyl-1-phenylpropan-1-one is incorporated in an amount of 0.1 to 5 parts by weight per 100 parts by weight of the resin components.

If this photopolymerization initiator is used, discoloration of the resin composition is controlled before and after the curing reaction, and a lens sheet having a high light transmission and excellent optical characteristics can be obtained. If the amount of the photopolymerization initiator incorporated is smaller than 0.1 part by weight per 100 parts by weight of the resin components, the reactivity is reduced and sometimes curing is not sufficiently advanced under usual conditions. If the amount of the photopolymerization initiator incorporated is larger than 5.0 parts by weight, discoloration of the cured product occurs.

Glass and plastics can be used for the transparent substrate constituting the lens sheet of the present invention. Plastic plates such as an acrylic resin plate and a polycarbonate plate, and plastic films such as a polyester film and an acrylic resin film, are preferably used.

The present invention will now be described in detail with reference to the following examples.

In the examples, the characteristics were determined by the following methods.

(1) Polymerization shrinkage

The polymerization shrinkage was determined by the above-mentioned method.

(2) Viscosity

The viscosity was measured by a B-type viscometer (Model BM supplied by Tokyo Keiki).

(3) Warp (rise D at the horizontal posture)

A square sample having a size of 300 mm ×was placed on a horizontal stand, rises at the four corners thereof were measured, and the mean value of the measured values was calculated.

(4) Total luminous transmittance

An ultraviolet-curing resin sheet having a thickness of 1 mm was prepared, and the total luminous transmittance was measured according to the method of ASTM D-1003.

(5) Removal from mold

A nickel stamper having a size of 900 mm × 1200 mm was fixed to a stand so that the total weight was 40 kg, an ultraviolet-curable resin was cast on the stamper, and a transparent acrylic resin plate having a size of 890 mm×1190 mm was piled on the cast resin. Curing was effected by irradiation with ultraviolet rays. Then the formed lens sheet was peeled from the corner, the state thereof was observed, and the property was evaluated by the following standards.

A: stamper or stand not moved at peeling
B: stamper moved at peeling, and peeling was possible
C: stamper moved and chipping or the like occurred (6) Adhesion A sample not having a lens profile was prepared by using a mirror-surface stamper, 100 1-mm square chequers were formed on the side of the ultra-violet-curable resin by cross cutting, peeling by using a cellophane adhesive tape was carried out three times, and the number of peeled chequers was counted.

Class 5: all chequers remained
Class 4: 75 to 99 of 100 chequers remained
Class 3: 74 to 50 of 100 chequers remained
Class 2: 49 to 25 of 100 chequers remained
Class 1: number of remaining chequers was 24 or less among 100 chequers examples 1 THROUGH 6 AND COMPARATIVE EXAMPLES 1 THROUGH 5

An ultraviolet-curable resin composition shown in Table 1 was prepared, and 2-hydroxy-2-methyl-1-phenyl- propan-1-one (Dalocure supplied by Merk) was added as the photopolymerization initiator in an amount of 2 parts by weight per 100 parts by weight of the resin composition.

Then, 600 g of the resin composition was cast on a lens mold constructed by fixing a stamper having a size of 900 mm×1200 mm to a stand so that the total weight was 40 kg, and a transparent acrylic resin plate (Acrylite #000 supplied by Mitsubishi Rayon) having a size of 890 mm x 1190 mm and a thickness of 3 mm, not containing an ultraviolet absorber and having a surface which was uniformly roughened by sand paper #800, was piled on the cast resin composition. The curing was effected by irradiation with an integrated dose of 760 $mJ/cm^2$ of ultraviolet rays by using an 80 W/cm high-pressure mercury lamp.

The results of the evaluation of the respective characteristics are shown in Table 1.

TABLE 1

| | Ultraviolet-curable composition | Viscosity of monomer mixture (mPa.s) | Polymerization shrinkage (%) | Modulus of elasticity ($kg/cm^2$) | Total luminous transmittance (%) | Removal from mold | Warp (mm) | State of lens |
|---|---|---|---|---|---|---|---|---|
| Example 1 | FA-321M(50)/A-BPE-4(10)/THFA(40 | 40 | 7.8 | 180 | 92 | A | 0 | o |
| Example 2 | FA-321M(50)HDDA(10)/THFA(40) | 30 | 8.2 | 250 | 91 | A | 0.5 | o |
| Example 3 | UK-6036(25)/FA-321M(25)/A-BPE-4(25)/THFA(25) | 180 | 7.7 | 800 | 90 | A | 2.0 | o |
| Example 4 | UV-3000B(28)/HDDA(14)/THFA(58) | 210 | 8.2 | 80 | 88 | A | 0 | o |
| Example 5 | UV-3000B(30)/A-BPE-4(10)/THFA(60) | 200 | 7.7 | 50 | 91 | A | 0 | o |
| Example 6 | FA-321M(30)SNEX-5487(10)/THFA(60) | 60 | 11.2 | 300 | 92 | A | 3.0 | o |
| Comparative Example 1 | M-315(70)/THFA(30) | 320 | 8.8 | 30000 | 72 | C | 12 | x |
| Comparative Example 2 | M-315(70)/NVP(30) | 320 | 8.7 | 26000 | 69 | C | 6 | x |
| Comparative Example 3 | FA-321M(30)SNEX-5487(10)/HDDA(20)/THFA(40) | 20 | 11.2 | 4000 | 91 | C | 8 | x |
| Comparative Example 4 | TAS(60)/HDDA(40) | 200 | 15.2 | 50000 | 92 | C | 16 | x |
| Comparative Example 5 | TAS(30)/HDDA(40)/THFA(30) | 30 | 13.2 | 18000 | 90 | C | 8 | x |

The abbreviations in Table 1 indicate the following compounds.

FA-321M: A compound supplied by Hitachi Chemical, which is represented by the following formula:

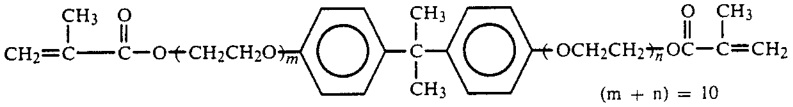

(m + n) = 10

A-BPE-4.: NK Ester supplied by Shin-Nakamura Kagaku, which is represented by the following formula:

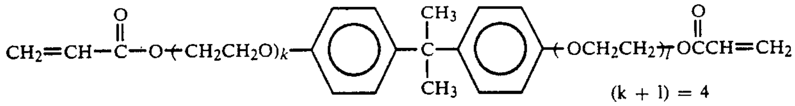

(k + l) = 4

THFA: Tetrahydrofurfuryl acrylate
HDDA: 1,6-Hexanediol diacrylate
UK-6036: Urethane diacrylate supplied by Mitsubishi Rayon
UV-3000B: Urethane diacrylate marketed under tradename of "Goselac" by Nippon Synthetic Chemical Ind.
SNEX-5487: Sannopco represented by the following formula:

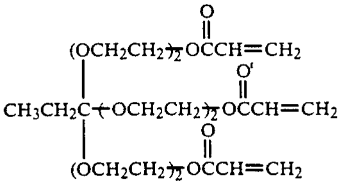

M-315: Aronix supplied by Toagosei Chemical Ind. which is represented by the following formula:

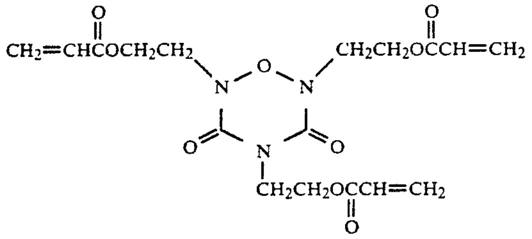

NVP: N-vinylpyrrolidone

TAS: A compound represented by the following formula:

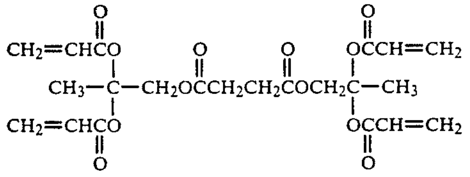

As apparent from the results shown in Table 1, the lens sheet of the present invention has a good release property, a high total luminous transmittance, and little warpage.

EXAMPLES 7 THROUGH 11 AND COMPARATIVE EXAMPLES 6 THROUGH 8

An ultraviolet-curable resin composition shown in Table 2 was prepared, and a photopolymerization initiator shown in Table 2 was added. In the same manner as described in Example 1, the resin composition was cast in a lens mold, an acrylic resin plate was piled thereon, and the resin composition was cured by irradiation with ultraviolet rays. The results are shown in Table 2.

TABLE 2

| | Ultraviolet-curable composition | Photo polymerization initiator | Amount of photopolymerization initiator (parts by weight) | Viscosity of monomer (mPa.s) | Polymerization shrinkage (%) | Modulus of elasticity (kg/cm²) | Total luminous transmittance (%) | Removal from mold | Adhesion (class) | State of lens | Warp (mm) |
|---|---|---|---|---|---|---|---|---|---|---|---|
| Example 7 | FA-321M(50)/ A-BPE-4(10)/ THFA(40) | HMPP | 1.5 | 40 | 7.8 | 180 | 92 | A | 5 | o | 0 |
| Example 8 | FA-321M(30)/ A-BPE-4(20)/ THFA(50) | MBF | 1.5 | 40 | 8.2 | 150 | 92 | A | 5 | o | 0.5 |
| Example 9 | FA-321M(40)/ A-BPE-4(20)/ THFA(40) | HCPX | 1.5 | 50 | 8.0 | 230 | 92 | A | 5 | o | 0 |
| Example 10 | FA-321M(45)/ A-BPE-4(25)/ THFA(30) | HMPP | 2.0 | 70 | 7.7 | 320 | 92 | A | 5 | o | 0 |
| Example 11 | FA-321M(60)/ A-BPE-4(5)/ THFA(35) | HMPP | 1.0 | 50 | 7.7 | 170 | 92 | A | 5 | o | 0 |
| Comparative Example 6 | FA-321M(40)/ HDDA(40)/ THFA(20) | HMPP | 1.5 | 30 | 8.6 | 1200 | 89 | C | 1 | o | 2.0 |
| Comparative Example 7 | HX(50)/ A-BPE-4(10)/ THFA(40) | HMPP | 1.5 | 20 | 11.4 | 4000 | 93 | C | 1 | x | 4.0 |
| Comparative Example 8 | FA-321M(50)/ A-BPE-4(10)/ THFA(40) | HMPP | 0.04 | 40 | Insufficient curing | — | — | — | — | — | — |

The abbreviations in Table 2 indicate the following compounds (the abbreviations in Table 1 are omitted).

HX: 1,6-Hexanediol dimethacrylate

HEMA: 2-Hydroxyethyl methacrylate

HMPP: 2-Hydroxy-2-methyl-1-phenylpropan-1-one

MBF: Methylbenzoyl formate

NCPK: 1-Hydroxycyclohexyl phenyl ketone

EXAMPLES 12 THROUGH 16 AND COMPARATIVE EXAMPLES 9 THROUGH 11

An ultraviolet-curable resin composition shown in Table 3 was prepared, and a photopolymerization initiator shown in Table 3 was added. In the same manner as described in Example 1, the resin composition was cast in a lens mold, an acrylic resin plate was piled on the cast resin composition, and curing was carried out by irradiation with ultraviolet rays. The results are shown in Table 3.

TABLE 3

| | Ultraviolet-curable composition | Photo-poly-meri-zation ini-tiator | Amount of photo-poly meri-zation ini-tiator (parts by weight) | Viscosity of monomer mixture (mPa.s) | Polymeri-zation shrinkage (%) | Modulus of elas-ticity (kg/cm$^2$) | Total luminous trans-mit-tance (%) | Re-moval from mold | Ad-hesion (class) | State of lens | Warp (mm) |
|---|---|---|---|---|---|---|---|---|---|---|---|
| Example 12 | FA-321M(30)/A-BPE-4(10)/UK-6036(20)/THFA(40) | HMPP | 1.5 | 70 | 7.4 | 220 | 92 | A | 5 | o | 0 |
| Example 13 | FA-321M(35)/A-BPE-4(20)UK-6036(5)/THFA(40) | HCPK | 1.0 | 50 | 8.0 | 260 | 91 | A | 5 | o | 0.5 |
| Example 14 | FA-321M(45)/A-BPE-4(5)/UK-6036(10)/THFA(40) | MBF | 3.0 | 50 | 7.7 | 190 | 92 | A | 5 | o | 0 |
| Example 15 | FA-321M(35)/A-BPE-4(10)/M-1100(15)/THFA(40) | MPF | 2.0 | 50 | 7.8 | 200 | 92 | A | 5 | o | 0 |
| Example 16 | FA-321M(50)/A-BPE-4(5)/M-1100(5)/THFA(40) | MMPP | 1.5 | 80 | 8.1 | 190 | 92 | A | 5 | o | 0.5 |
| Compar-ative-Example 9 | FA-321M(40)/A-BPE-4(10)/TMPTA(10)/THFA(40) | HMPP | 1.5 | 30 | 9.6 | 1200 | 92 | C | 1 | o | 2.5 |
| Compar-ative Example 10 | FA-321M(30)/A-BPE-4(10)/UK-6036(20)/THFA(40) | HMPP | 0.02 | 70 | Insuf-ficient curing | — | — | — | — | — | — |
| Compar-ative Example 11 | HX(50)/A-BPE-4(10)/UK-6036(10)/THFA(30) | HMPP | 1.5 | 40 | 10.4 | 3400 | 92 | C | 2 | x | 3.5 |

In Table 3, M-1100 indicates an urethane acrylate marketed under the tradename of Aronix by Toagosei Chem. Ind. (other abbreviations indicate compounds described above with reference to Tables 1 and 2).

EXAMPLES 17 AND 18 AND COMPARATIVE EXAMPLES 14 AND 15

An ultraviolet-curable composition shown in Table 4 was prepared, and 2-hydroxy-2-methyl-1-phenylpropan-1-one (Dalocure supplied by Merk) was added as the photopolymerization initiator in an amount of 2 parts by weight per 100 parts by weight of the resin composition.

Then, 600 g of the resin composition was cast in a lens mold constructed by fixing a nickel stamper having a size of 900 mm×1200 mm to a stand so that the total weight was 40 kg, and a transparent polyester film (Diafoil #125 125 supplied by Diafoil) having a size of 920 mm×1220 mm, the surface of which was roughened by sand paper #800, was piled on the cast resin composition. The assembly was pressed by a rubber roller to uniformalize the thickness, and curing was effected by an integrated dose of 760 mJ/cm$^2$ of ultraviolet rays by using an 80 W/cm high-pressure mercury lamp.

The results of the evaluation of the respective characteristics are shown in Table 4.

TABLE 4

| | Ultraviolet-curable composition | Viscosity of monomer mixture (mPa.s) | Polymeri-zation shrinkage (%) | Modulus of elasticity (kg/cm$^2$) | Total luminous trans-mittance (%) | Removal from mold | Warp (mm) | State of lens |
|---|---|---|---|---|---|---|---|---|
| Example 17 | FA-321M(50)/A-BPE-4(10)/THFA(40) | 40 | 7.8 | 180 | 92 | A | 0 | o |
| Example 18 | UV-3000B(30)/A-BPE-4(10)/THFA(60) | 200 | 7.7 | 50 | 91 | A | 0 | o |
| Compar-ative Example 14 | M-315(70)/NVP(30) | 320 | 8.8 | 30,000 | 72 | Cracking C | — | Chipping at removal from mold x |
| Compar-ative Example 15 | TAS(60)/HDDA(40) | 200 | 15.1 | 50,000 | 92 | Cracking C | — | Chipping at removal from mold x |

The abbreviations in Table 4 indicate the same compounds as in Table 1.

In the lens sheet of the present invention, the ultraviolet-curable resin constituting the lens portion has an excellent adhesion to a transparent substrate, especially an acrylic resin and since the strength of the resin per se is relatively low, the formed lens sheet can be easily removed from the mold, and is little damaged upon removal from the mold. Moreover, since the resin is a crosslinked polymer, the lens portion has an excellent shape-retaining property. The lens sheet is not cracked, and chipping or breaking rarely occurs during transportation. Moreover, the respective monomers have a good compatibility and a resin having an excellent transparency is formed. Furthermore, since the resin composition has a low viscosity the resin composition can be easily cast in a mold, and very few air bubbles are included in the cast resin; if air bubbles are incorporated, they can be easily removed. Still further, the polymerization shrinkage at curing is small, the modulus of elasticity of the cured resin is low, and the cured resin has rubbery characteristics. Therefore, little warping due to the two-layer structure occurs in the lens sheet of the present invention.

Moreover, when the transparent substrate of the lens sheet of the present invention is a film, the lens sheet can be prepared without cracking.

The foregoing advantages become more conspicuous when the composition comprising the above-mentioned dimethacrylate (a), diacrylate (b) and monoacrylate (c) or the composition comprising the urethane acrylate (d) in addition to the foregoing components (a), (b) and (c) is used.

We claim:

1. A lens sheet comprising a transparent substrate and a lens portion composed of a cured product of an ultraviolet-curable resin composition, which is formed on at least one surface of the transparent substrate, wherein the polymerization shrinkage, calculated based on the difference of the specific gravity at 25° C., of the ultraviolet-curable resin composition, caused at curing, is not larger than 20% and the modulus of elasticity at 25° C. after curing is 10 to 1,000 kg/cm$^2$.

2. A lens sheet as set forth in claim 1, wherein the ultraviolet-curable resin composition comprises at least one polyvalent monomer selected from the group consisting of a polyvalent methacrylate and a polyvalent acrylate, at least one univalent monomer selected from the group consisting of a monomethacrylate and a monoacrylate, and a photopolymerization initiator, as main components.

3. A lens sheet as set forth in claim 1, wherein the polyvalent monomer is selected from the group consisting of a polyol polymethacrylate, a polyol polyacrylate, a polyester polymethacrylate, a polyester polyacrylate, an epoxy polymethacrylate, an epoxy polyacrylate, a urethane polymethacrylate, a urethane polyacrylate, and a mixture of two or more thereof.

4. A lens sheet as set forth in claim 3, wherein the polyol polymethacrylate and polyol polyacrylate are reaction products between a polyether polyol and methacrylic acid and acrylic acid, respectively.

5. A lens sheet as set forth in claim 4, wherein the polyether polyol has a polyoxyalkylene glycol skeleton.

6. A lens sheet as set forth in claim 4, wherein the polyether polyol has a bisphenol skeleton.

7. A lens sheet as set forth in claim 4, wherein the polyol polymethacrylate and polyol polyacrylate are represented by the following general formula (I):

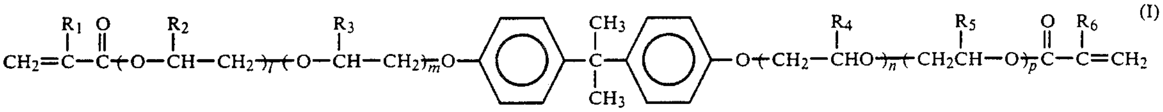

(I)

wherein $R_1$, $R_2$, $R_3$, $R_4$, $R_5$ and $R_6$ independently represent H or $CH_3$, and l, m, n and p are zero or positive integers provided that the sum of l and m is not zero and the sum of n and p is not zero.

8. A lens sheet as set forth in claim 2, wherein the monomethacrylate and monoacrylate are reaction products between tetrahydrofurfuryl alcohol or a derivative thereof and methacrylic acid and acrylic acid, respectively.

9. A lens sheet as set forth in claim 8, wherein the tetrahydrofurfuryl alcohol derivative is represented by the following formula (II) or the following formula (III):

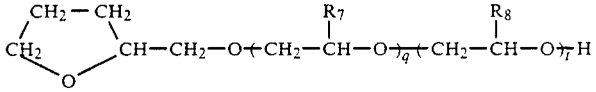

(II)

wherein $R_7$ and $R_8$ independently represent H or $CH_3$, and q and t are zero or positive integers provided that the sum of q and t is not zero, and

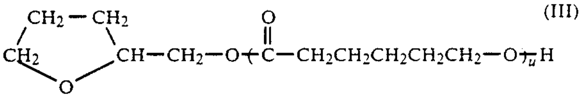

(III)

wherein u is a positive integer.

10. A lens sheet as set forth in claim 2, wherein the ultraviolet-curable resin composition comprises 30 to 60% by weight of a polyol dimethacrylate of the following formula (a), which is included with in the scope of the formula (I):

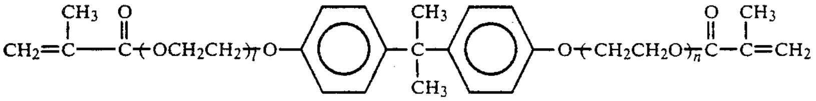

(a)

wherein l and n are positive integers and the sum of l and n is 8 to 12, 5 to 25% by weight of a polyol diacrylate of the following formula (b), which is included within the scope 10 of the formula (I):

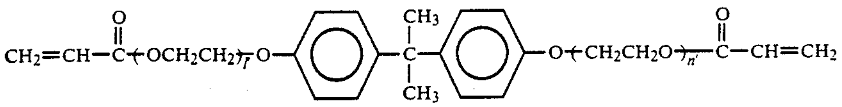

(b)

wherein l' and n' are positive integers and the sum of l' and n' is 3 to 5, and 30 to 60% by weight of tetrahydrofurfuryl acrylate of the following formula (c):

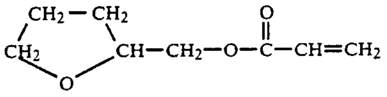

(c)

11. A lens sheet as set forth in claim 2, wherein the ultraviolet-curable resin composition further comprises 5 to 25% by weight of a urethane polyacrylate (d) in addition to the three components (a), (b) and (c).

12. A lens sheet as set forth in claim 2, wherein the ultraviolet-curable resin composition comprises at least one photopolymerization initiator selected from the group consisting of methylbenzoyl formate, 1-hydroxycyclohexyl phenyl ketone and 2-hydroxy-2-methyl-1-phenylpropane-1-one in an amount of 0.1 to 5 parts by weight per 100 parts by weight of the resin components.

13. A lens sheet as set forth in claim 2, wherein the viscosity of the ultraviolet-curable resin composition at 25° C. is not larger than 300 mPa·s.

14. A lens sheet as set forth in claim 1, wherein the total luminous transmittance of the lens portion as calculated as the thickness of 1 mm is at least 85%.

15. A lens sheet as set forth in any of claim 1, wherein when the lens sheet is horizontally placed, the rise of the sheet satisfies the requirement represented by the following formula:

$$D \leqq R/50$$

wherein D represents the rise (mm) and R represents the distance (mm) in the horizontal direction from the center of the lens sheet.

16. A lens sheet as set forth in claim 1, wherein the transparent substrate is an acrylic resin plate.

17. A lens sheet as set forth in claim 1, wherein the transparent substrate is a polyester film.

* * * * *

UNITED STATES PATENT AND TRADEMARK OFFICE
CERTIFICATE OF CORRECTION

PATENT NO.  : 5,015,524
DATED       : May 14, 1991
INVENTOR(S) : Kobayashi et al.

It is certified that error appears in the above-identified patent and that said Letters Patent is hereby corrected as shown below:

Col. 3, line 65, "opapentanoxy" should read --oxapentanoxy--. Col. 5, line 23, "tetrahyirofurfuryloxy" should read --tetrahydrofurfuryloxy--; lines 36-37, "4-methyl-5-tetrahydrofurfuryl-3,6-dioxaoctan-1-ol," should read --4-methyl-5-tetrahydrofurfuryloxy-3-oxapentan-1-ol,--; line 42, "tetrahyirofurfuryloxy" should read --tetrahydrofurfuryloxy--; lines 56-57, "tetraoxatetradcan" should read --tetraoxatetradecan--; line 59, "tetrahyirofurfuryloxy" should read --tetrahydrofurfuryloxy--; line 66, "tetrahyirofurfuryloxy" should read --tetrahydrofurfuryloxy--. Col. 6, lines 9-10, "tetrahyirofurfuryl" should read --tetrahydrofurfuryl--; line 21, "to 25%" should read --5 to 25%--. Col. 7, line 58, "V" should read --v--. Col. 13, TABLE 3, Example 15, 2nd col., "MPF" should read --MBF--. Col. 16, line 67, "scope 10" should read --scope--.

Signed and Sealed this

Fifth Day of January, 1993

Attest:

DOUGLAS B. COMER

Attesting Officer

Acting Commissioner of Patents and Trademarks